United States Patent
Abe

(10) Patent No.: US 10,297,924 B2
(45) Date of Patent: May 21, 2019

(54) RADAR ANTENNA UNIT AND RADAR DEVICE

(71) Applicant: Nidec Corporation, Kyoto (JP)

(72) Inventor: Akira Abe, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 306 days.

(21) Appl. No.: 15/248,132

(22) Filed: Aug. 26, 2016

(65) Prior Publication Data

US 2017/0062929 A1 Mar. 2, 2017

(30) Foreign Application Priority Data

Aug. 27, 2015 (JP) .................................. 2015-168364
Jul. 26, 2016 (JP) .................................. 2016-146695

(51) Int. Cl.
*H01Q 21/06* (2006.01)
*H01Q 13/02* (2006.01)
(Continued)

(52) U.S. Cl.
CPC ......... *H01Q 21/064* (2013.01); *H01Q 13/025* (2013.01); *G01S 13/931* (2013.01); *G01S 2013/0254* (2013.01)

(58) Field of Classification Search
None
See application file for complete search history.

(56) References Cited

U.S. PATENT DOCUMENTS

| 2,416,155 A | * | 2/1947 | Chubb | ...................... G01S 1/02 |
| | | | | 181/125 |
| 2,692,336 A | * | 10/1954 | Kock | ..................... H01Q 19/08 |
| | | | | 343/778 |

(Continued)

FOREIGN PATENT DOCUMENTS

| CN | 102623804 B | 3/2016 |
| JP | 2012-147105 A | 8/2012 |

(Continued)

OTHER PUBLICATIONS

Abe, A.; "Waveguide, Slotted Antenna and Horn Antenna," U.S. Appl. No. 15/248,135, filed Aug. 26, 2016.

*Primary Examiner* — Bernarr E Gregory
(74) *Attorney, Agent, or Firm* — Keating & Bennett, LLP

(57) ABSTRACT

A radar antenna assembly includes a transmitting antenna including transmitting horns and receiving antennas including receiving horns. The receiving antennas are at regular intervals in a second direction perpendicular to a first direction, and the transmitting antenna is adjacent to the receiving antennas in the second direction. The transmitting horns are at regular intervals in the first direction, and the transmitting antenna includes an oblique arrangement portion and a reverse oblique arrangement portion. The reverse oblique arrangement portion is adjacent to the oblique arrangement portion in the first direction, and the oblique arrangement portion and the reverse oblique arrangement portion are symmetrical to each other about a plane perpendicular to the first direction. The transmitting horns included in the oblique arrangement portion or the reverse oblique arrangement portion are adjacent to each other in the first direction with at least two sorts of magnitude of displacement therebetween.

12 Claims, 8 Drawing Sheets

(51) Int. Cl.
*G01S 13/93* (2006.01)
*G01S 13/02* (2006.01)
*G01S 13/00* (2006.01)

(56) References Cited

U.S. PATENT DOCUMENTS

| | | | | |
|---|---|---|---|---|
| 3,474,454 A * | 10/1969 | Kempic | ............... | H01Q 3/38 333/109 |
| 4,115,782 A * | 9/1978 | Han | ............... | H01Q 21/064 343/779 |
| 4,356,497 A * | 10/1982 | Dudome | ............ | H01Q 21/0018 342/371 |
| 4,527,165 A * | 7/1985 | de Ronde | ............ | H01Q 21/064 343/778 |
| 4,899,163 A * | 2/1990 | Daniel | ................ | H01Q 21/065 343/700 MS |
| 5,111,210 A * | 5/1992 | Morse | ................ | H01Q 21/205 342/147 |
| 5,426,442 A * | 6/1995 | Haas | ................ | H01Q 21/064 343/772 |
| 7,724,176 B1 * | 5/2010 | Pruett | ................ | H01Q 21/08 342/175 |
| 9,097,797 B2 | 8/2015 | Abe | | |
| 9,136,605 B2 * | 9/2015 | Abe | ................ | H01Q 21/064 |
| 9,954,282 B2 * | 4/2018 | Abe | ................ | H01Q 21/064 |
| 2005/0088356 A1 * | 4/2005 | Lenormand | .......... | H01Q 3/2658 343/781 R |
| 2006/0158382 A1 * | 7/2006 | Nagai | ................ | H01Q 21/064 343/786 |
| 2012/0229362 A1 | 9/2012 | Abe | | |
| 2013/0033404 A1 | 2/2013 | Abe | | |
| 2015/0349415 A1 * | 12/2015 | Iwanaka | ............. | H01Q 21/064 343/786 |

FOREIGN PATENT DOCUMENTS

JP 2013-032979 A 2/2013
JP 5667887 B2 2/2015

* cited by examiner

Fig. 10A
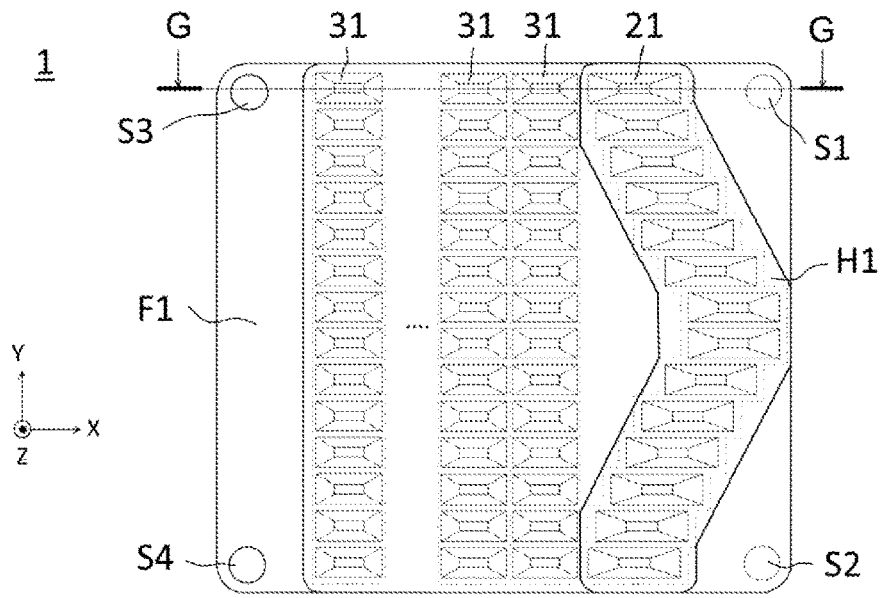
Fig. 10B
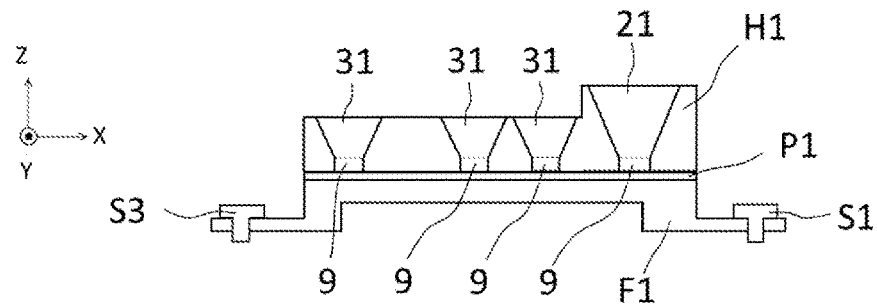
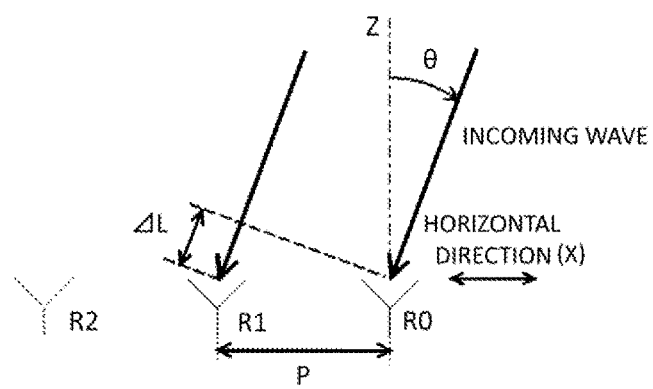
Fig. 11

RADAR ANTENNA UNIT AND RADAR DEVICE

BACKGROUND OF THE INVENTION

1. Field of the Invention

The present invention relates to an antenna device used for an onboard millimeter wave radar, in particular, to a digital beam forming (DBF) radar that monitors the direction of travel of an automobile.

2. Description of the Related Art

A DBF radar includes a receiving array composed of a plurality of receiving antenna elements arranged at predetermined intervals (typically, regular intervals) in a scan direction. The DBF radar converts received signals from each receiving antenna element into digital data, performs arithmetic processing on the digital data to impart a phase shift to each received signal, and synthesizes the phase-shifted received signal to generate an equivalent scan beam. A method of direct azimuth detection, such as monopulse angle measurement, or a high resolution detection method, such as multiple signal classification (MUSIC) method, can also be applied. The DBF radar can scan at high speed with high precision without the need for any drive part or movable mechanism and therefore is widely used as the onboard millimeter wave radar.

However, the DBF radar requires performing measurement to prevent erroneous detection due to the grating lobe phenomenon.

FIG. 11 is a diagram illustrating an overview of the principle of azimuth detection using a receiving antenna array and reference symbols or the like used in the following description. A plurality of receiving antenna elements R0, R1, R2 and so on are arranged at regular interval P in the horizontal direction to form a receiving array. Each receiving antenna element includes an antenna and a receiver and an analog-to-digital signal converter connected to the antenna, although this drawing shows only the arrangement of the antennas. A coordinate system the X axis of which extends in the horizontal direction and the Z axis of which extends in a direction straight ahead of an aperture plane of the antenna is defined, and the XZ plane is a scan plane. The angle of deviation from the Z axis in the horizontal direction is denoted by θ, and in this drawing, the deviation to the right is denoted as a positive value (+), and the deviation to the left is denoted as a negative value (−).

For an incoming wave from the θ direction, a propagation path length difference ΔL occurs between the incident waves to adjacent receiving antenna elements, and there is a phase difference Δφ between the received waves.

$$\Delta L = P \cdot \sin\theta \qquad \text{Expression 1}$$

$$\Delta\phi = k \cdot \Delta L + 2i\pi \qquad \text{Expression 2}$$

where i denotes an integer (0, ±1, . . . ) that minimizes the absolute value of Δφ, k denotes a wave number (=2π/λ), and λ denotes a wavelength in free space, which is 3.92 mm at 76.5 Ghz used for the onboard millimeter wave radar. According to these relations, the detection value Θ of the incoming wave azimuth is calculated from the phase difference.

$$\Theta = \sin^{-1}\left(\frac{\Delta\phi}{kP}\right) \qquad \text{Expression 3}$$

If Δφ falls within a range of 0±π (180°), Θ agrees with θ, and the azimuth can be determined.

The incoming wave azimuths for which Δφ=π and 2π are denoted as χ and γ, respectively.

$$\chi = \sin^{-1}\left(\frac{\lambda}{2P}\right) \qquad \text{Expression 4}$$

$$\gamma = \sin^{-1}\left(\frac{\lambda}{P}\right) \qquad \text{Expression 5}$$

When θ falls within a range of ±χ, azimuth detection can be achieved. For purposes of explanation, this range will be referred to as a main region, and the remaining range will be referred to as an outside region. In the outside region, if θ is slightly greater than χ (θ=γ+δ), the following relation holds, and left-to-right inversion occurs.

$$\Theta \approx -\delta \qquad \text{Expression 6}$$

If Θ is close to γ (θ=γ±δ), the following relation holds, and an object to the side is detected as being present in the front direction.

$$\Theta \approx \pm\delta \qquad \text{Expression 7}$$

To deal with a plurality of incoming waves, the number of receiving antenna elements needs to be increased according to the number of the incoming waves, and various separation methods need to be used. However, the detection region determined by the interval P and the relationship between the incoming wave azimuth θ and the detection value Θ still hold.

That is, erroneous detection occurs due to an incoming wave from the outside region. To prevent this, there are contemplated methods of reducing gain in the outside region of the radar antenna unit.

Japanese Patent Laid-Open No. 2013-032979 discloses an antenna arrangement that includes a slotted waveguide array and rectangular horns added thereto as a radiator. In this example, a radiation pattern of the horns, in particular, null characteristics, is used.

Japanese Patent No. 5667887 discloses radiating elements of a transmitting antenna are sequentially displaced in either lateral direction (scan direction) so as to be arranged in symmetry in a longitudinal direction.

The antenna disclosed in Japanese Patent Publication No. 2013-032979 can achieve high gain since the power supply loss in the waveguide is low, and the rectangular horns, which are highly efficient, are used. In addition, since the whole of the antenna is made of metal plates, significant performance variation, deformation or the like due to heat does not occur, and the antenna has a heat radiation effect. That is, the antenna has characteristics suitable for application to a small onboard radar. However, in order to achieve a desired directivity, more specifically, in order to achieve a directivity that attains high gain only in the main region and minimizes a side lobe in the outside region, by improving the radiation characteristics of the horns themselves, the dimensions, in particular, the depth, of the horns need to be increased. Thus, this antenna has an undesirably large size. In view of such circumstances, the structure in which the horns are displaced from each other in the lateral direction, such as that disclosed in Japanese Patent No. 5667887, has been devised. However, Japanese Patent No. 5667887 discloses only the number of radiating elements of a printed antenna and an optimum arrangement depending on the intervals between the elements.

SUMMARY OF THE INVENTION

In view of such circumstances, preferred embodiments of the present invention are able to reduce a size of a side lobe by appropriately arranging horns.

A preferred embodiment of the present invention provides a radar antenna assembly including a transmitting antenna including a plurality of transmitting horns defining an oblique arrangement portion and a reverse oblique arrangement portion, and a plurality of receiving antennas each including a plurality of receiving horns arranged in a first direction, wherein the plurality of receiving antennas are arranged in a second direction perpendicular to the first direction, the transmitting antenna is disposed adjacent to the receiving antennas in the second direction, the transmitting horns included in the oblique arrangement portion are displaced from each other in the second direction along the arrangement of the transmitting horns in the first direction, and the transmitting horns included in the reverse oblique arrangement portion are displaced from each other in a direction opposite to the second direction along the arrangement of the transmitting horns in the first direction, the plurality of transmitting horns are disposed at regular intervals in the first direction, the reverse oblique arrangement portion is disposed adjacent to the oblique arrangement portion in the first direction, the arrangement of the transmitting horns included in the oblique arrangement portion and the arrangement of the transmitting horns included in the reverse oblique arrangement portion are symmetrical to each other with respect to a plane perpendicular to the first direction, the transmitting horns included in the oblique arrangement portion or the reverse oblique arrangement portion are adjacent to each other in the first direction with at least two sorts of magnitude of displacement in the second direction therebetween, the number of the transmitting horns is 2N, where N denotes an integer equal to or greater than 1, the plurality of receiving antennas are arranged at regular intervals P in the second direction, and an average value of displacements in the second direction between the transmitting horns adjacent in the first direction is equal to or smaller than $2P/N$ and equal to or greater than $P(N-1)/N^2$.

The radar antenna assembly according to various preferred embodiments of the present invention reduce a size of a side lobe by appropriately arranging transmitting horns and receiving horns.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10A shows a radar antenna assembly according to a preferred embodiment of the present invention including a fixing member.

FIG. 10B is a cross-sectional view of the radar antenna assembly according to a preferred embodiment of the present invention taken along the line A-A.

FIG. 11 is a diagram illustrating a principle of azimuth detection using a receiving antenna array.

DETAILED DESCRIPTION OF THE PREFERRED EMBODIMENTS

Figure 1A:
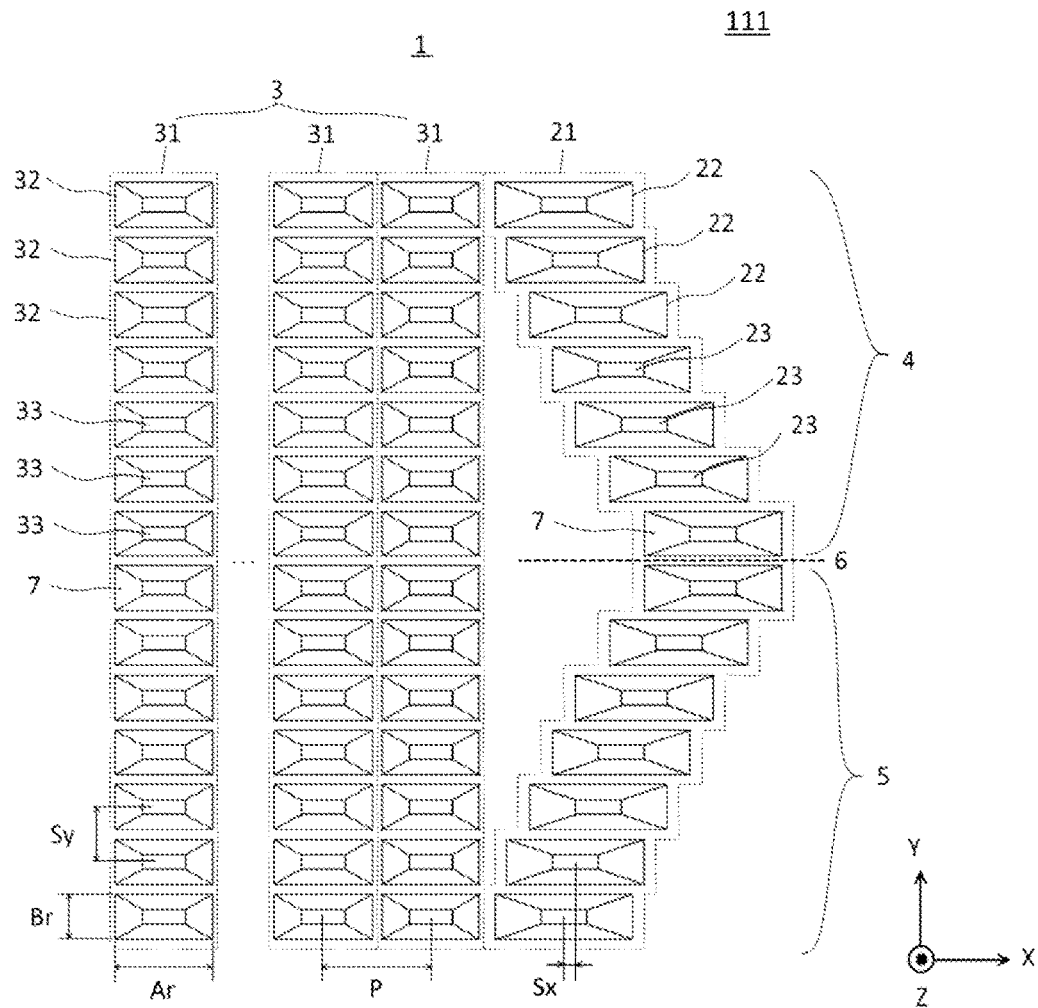
FIG. 1A shows a configuration of a radar antenna assembly according to a first preferred embodiment of the present invention.
Figure 12:
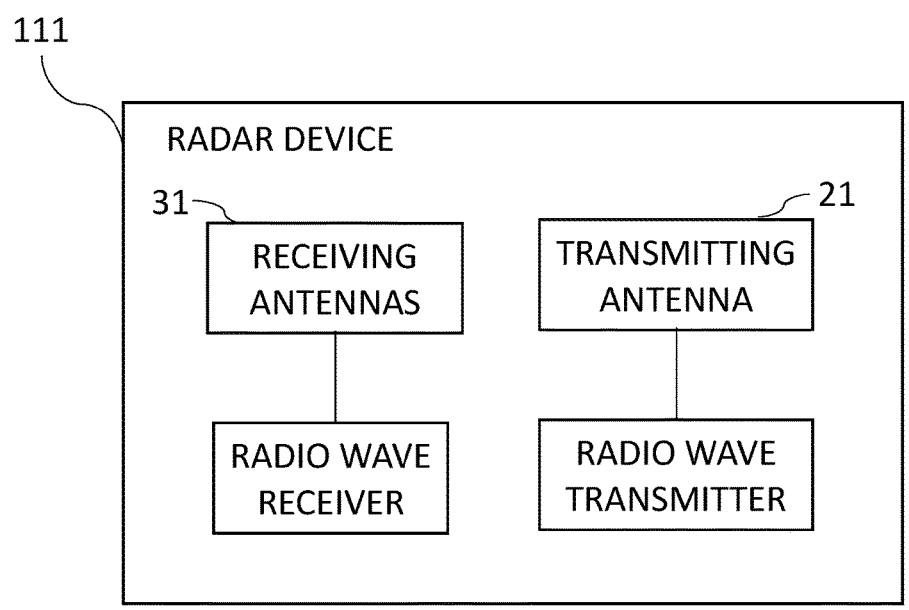
FIG. 12 is a diagram illustrating a radar device according to the first preferred embodiment of the present invention.

FIGS. 1A and 12 show a configuration of a radar device 111 according to a first preferred embodiment of the present invention. The radar device 111 includes a radar antenna assembly 1, a radio wave transmitter including at least one channel of a transmitting end and a radio wave receiver including a plurality of receiving ends. The radar antenna assembly 1 further includes a transmitting antenna 21 connected to the transmitting end and a receiving antenna array 3 defined by a plurality of receiving antennas 31 each of which is connected to a different one of the plurality of receiving ends. Although only one transmitting antenna 21 is included in this preferred embodiment, for example, a plurality of transmitting antennas 21 may be included depending on the functional requirements of the radar antenna assembly 1. Note that, in this drawing, the radio wave transmitter and the radio wave receiver are not shown.

Each antenna preferably has the structure shown, for example, in Japanese Patent Laid-Open No. 2013-032979. Specifically, the antenna is preferably a slotted waveguide array that includes a rectangular waveguide 9 extending in a first direction (Y direction) and having a large number of slots formed therein, the slots being formed in such a manner that the electric fields radiated from the slots are in phase. The antenna has high gain in a direction straight ahead of a radiating surface thereof. Each slot is provided with a rectangular horn. The antenna is able to transmit or receive a Y-directional linearly polarized wave.

The transmitting antenna 21 preferably includes a plurality of transmitting horns 22, and the transmitting horns 22 are disposed at regular intervals in the first direction. Each transmitting horn 22 preferably includes a transmitting slot 23. The receiving antenna array 3 includes a plurality of receiving antennas 31 arranged in a second direction (X direction) that is perpendicular to the first direction. The receiving antenna 31 preferably includes a plurality of receiving horns 32 arranged in the first direction. Each receiving horn 32 preferably includes a receiving slot 33. The plurality of receiving antennas 31 are arranged at regular intervals in the second direction (X direction), and the transmitting antenna 21 is disposed adjacent to the receiving antennas 31 in the second direction. The transmitting horns 22 and the receiving horns 32 preferably have the shape of a rectangle with long sides extending in the X direction and short sides extending in the Y direction. Similarly, the transmitting slots 23 and the receiving slots 33 preferably have the shape of a rectangle with long sides extending in the X direction and short sides extending in the Y direction.

The transmitting antenna 21 preferably includes an oblique arrangement portion 4, in which a plurality of transmitting horns 22 are displaced by a displacement Sx from each other in the X direction along the arrangement of the transmitting horns in the Y direction, and a reverse oblique arrangement portion 5, in which a plurality of transmitting horns 22 are displaced by Sx from each other in a direction opposite to the X direction, that is, the –X direction, along the arrangement of the transmitting horns in the Y direction. The reverse oblique arrangement portion 5 is disposed adjacent to the oblique arrangement portion 4 in the Y direction (below the oblique arrangement portion 4 in the drawing). The arrangement of the plurality of transmitting horns 22 included in the oblique arrangement portion 4 and the arrangement of the plurality of transmitting horns 22 included in the reverse oblique arrangement portion are preferably symmetrical to each other with respect to a plane 6 perpendicular to the Y direction. The oblique arrangement portion 4 and the reverse oblique arrangement portion 5 have a V-shaped arrangement as a whole. Not all the transmitting horns 22 in the oblique arrangement portion 4 and the reverse oblique arrangement portion 5 do not need to be obliquely arranged. Preferably, at least some of the transmitting horns 22 should be displaced in the X direction or –X direction.

Figure 6:
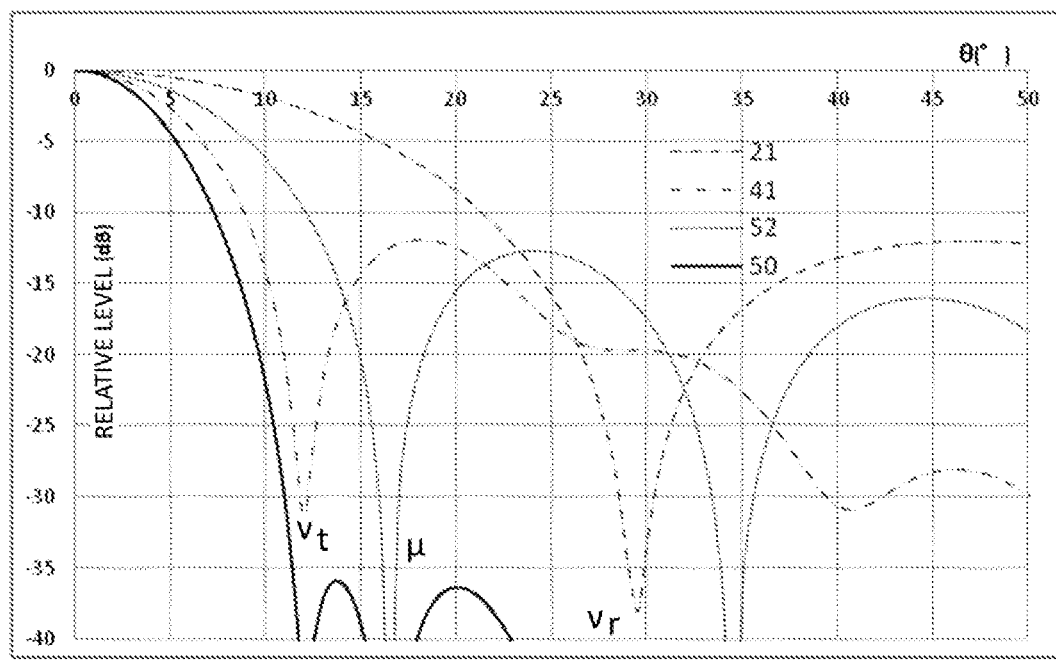
FIG. 6 shows horizontal directivity characteristics of the radar antenna assembly according to the first preferred embodiment of the present invention.

A typical rectangular horn preferably has the shape of a pyramid with a rectangular cross section perpendicular to the direction of travel of the radio wave gradually expanding from the rectangular waveguide as an input/output end (this horn will be referred to as a standard horn, hereinafter), and a TE10 component, which is the fundamental mode of the rectangular waveguide, appears without change as the amplitude distribution in the aperture plane. The wave front (equiphase wave surface) at the aperture plane is a curved surface of an elliptical sphere as described in Antenna Engineering Handbook, Second Edition, Institute of Electronics, Information and Communication Engineers, with reference to FIG. 6.3, and a phase delay occurs at points close to the wall. As a result of the phase delay, performance degradation, such as a decrease in gain or an increase of a side lobe, occurs, and null points become obscure, as shown in FIGS. 6.5 and 6.6 in Antenna Engineering Handbook, Second Edition, Institute of Electronics, Information and Communication Engineers.

Figure 1B:
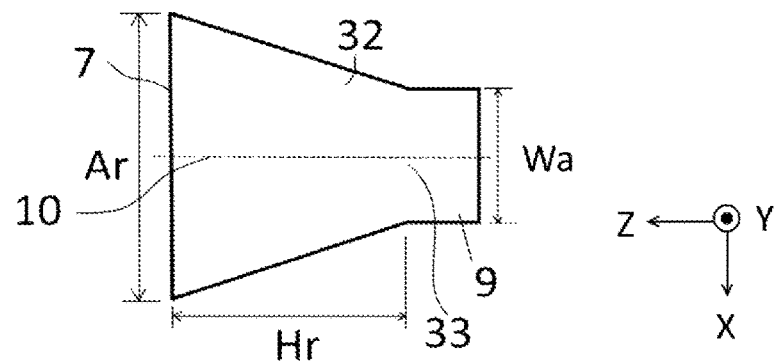
FIG. 1B is a cross-sectional view of a receiving horn according to the first preferred embodiment of the present invention taken in an X direction.

FIG. 1B is a cross-sectional view of the receiving horn 32 in the X direction. As shown in FIGS. 1A and 1B, the dimensions of an aperture plane 7 of the rectangular horn are denoted by reference symbols as follows: the lateral width is denoted by A, the longitudinal length is denoted by B, the depth from the aperture plane to the rectangular waveguide 9 is denoted by H, and the dimension in the X direction (dimension of the long side) of the rectangular waveguide 9 (receiving slot 33) is denoted by Wa. The receiving antennas 31 are disposed at regular intervals in the X direction, and the interval between the adjacent receiving antennas 31 is denoted by P. Subscripts t and r indicate that the reference symbol denotes the dimension of the transmitting antenna and the receiving antenna, respectively.

Figure 2A:
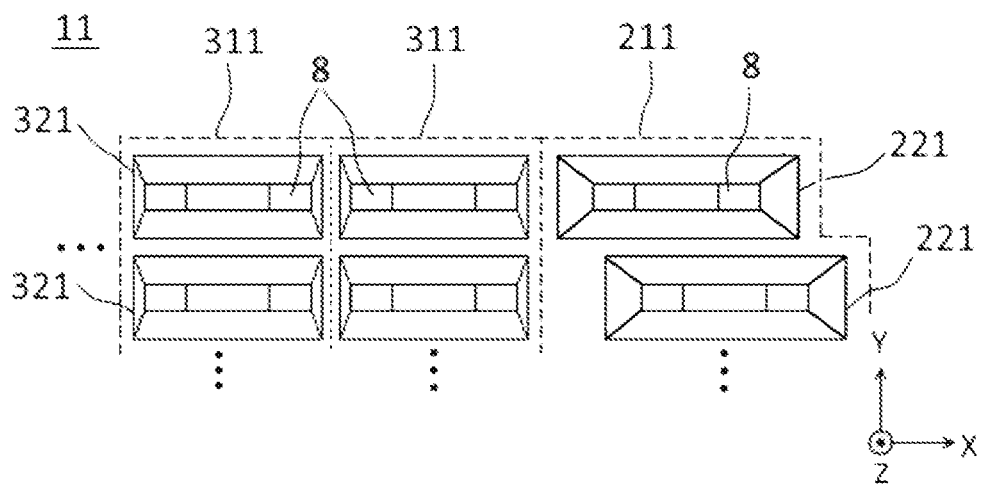
FIG. 2A shows a receiving antenna and a transmitting antenna according to a modification of the first preferred embodiment of the present invention.
Figure 2B:
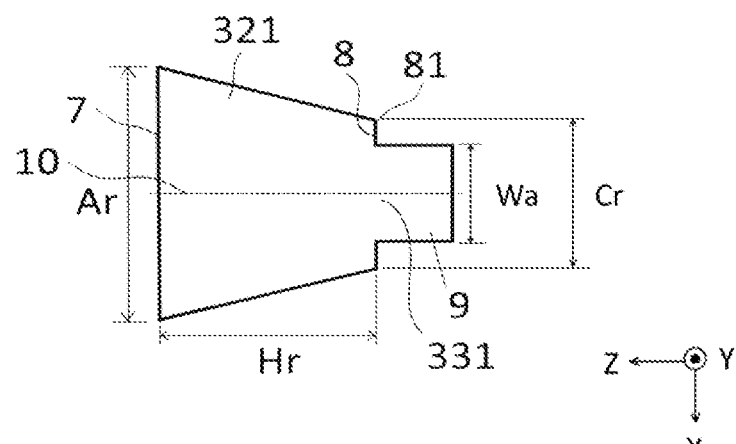
FIG. 2B is a cross-sectional view of a receiving horn according to the modification of the first preferred embodiment of the present invention taken along the X direction.
Figure 2C:
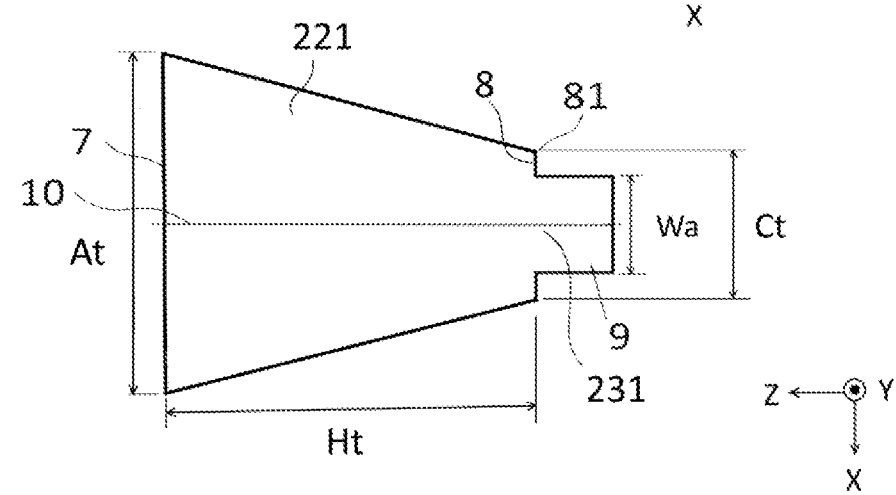
FIG. 2C is a cross-sectional view of a transmitting horn according to the modification of the first preferred embodiment of the present invention taken along the X direction.

FIGS. 2A-2C show a radar antenna assembly 11 according to a modification of the first preferred embodiment of the present invention.

FIG. 2A shows a receiving antenna 311 and a transmitting antenna 211, FIG. 2B is a cross-sectional view of a receiving horn 321 in the X direction, and FIG. 2C is a cross-sectional view of a transmitting horn 221 in the X direction. The receiving horn each connects to a rectangular waveguide at a base portion thereof. The radar antenna assembly 11 preferably includes a flat surface portion 8 between the rectangular waveguide 9 and the receiving horn 321, the flat surface portion 8 extending from the inner wall of the receiving horn 321 toward the rectangular waveguide 9. In this example, the flat surface portion 8 is preferably perpendicular to the axis of the receiving horn 321. However, the flat surface portion 8 according to preferred embodiments of the present invention is not limited to the flat surface portion 8 perpendicular to the axis of the receiving horn 321 but may be oblique with respect to the axis of the receiving horn 321. The horn with the flat surface portion 8 is also referred to as a box horn. The flat surface portion 8 provides a step-shaped discontinuous portion 81 on the side surface of the horn. The discontinuous portion 81 causes the TE30 mode of higher-order modes and is able to improve or modify the radiation characteristics. For details of the principle of this phenomenon, see the description of FIGS. 3 and 4 of Japanese Patent Laid-Open No. 2013-032979. Now, the horn with the step-shaped discontinuous portion (referred to as a stepped horn, hereinafter) and the standard horn will be compared in terms of radiation characteristics by plane wave analysis (on the assumption that there is no phase delay caused by the curvature of the wave front). The flat surface portion 8 is provided not only in the receiving horn 321 but also in the transmitting horn 221 shown in FIG. 2C.

The electric field distribution in the aperture plane 7 of the stepped horn is expressed by the following expressions.

$$E_x = 0 \qquad \text{Expression 8}$$

$$E_Y = \alpha_1 \cdot \cos\left(\frac{\pi X}{A}\right) - \alpha_3 \cdot \cos\left(\frac{3\pi X}{A}\right) \qquad \text{Expression 9}$$

In these expressions, provided that the central point of the rectangular aperture plane 7 is the origin, X is equal to or greater than –A/2 and equal to or smaller than A/2, $\alpha_1$ and $\alpha_3$ are coefficients that indicate the electric field strength of the TE10 mode component and the TE30 mode component, respectively, and the directions of the electric fields of the components are opposite at the center of the aperture plane (X=0).

If the ratio between $\alpha_1$ and $\alpha_3$ ($=\alpha_3/\alpha_1$) is denoted by $\zeta$, the aperture efficiency $\eta$ and the relative radiation directivity characteristics Dx in the x direction are expressed by the following expressions.

$$\eta = \frac{8\left(1+\frac{\zeta}{3}\right)^2}{\pi^2(1+\zeta^2)} \qquad \text{Expression 10}$$

$$D_X = \frac{\cos(\pi u)\left(\frac{1}{1-4u^2} + \frac{3\zeta}{9-4u^2}\right)}{1+\frac{\zeta}{3}} \qquad \text{Expression 11}$$

In these expressions, $u=A/\lambda*\sin\theta$, A denotes the lateral width of the horn aperture, and $\theta$ denotes the azimuth angle. An azimuth angle $v$ at which a null point appears is determined by calculating an azimuth angle $v$ at which Dx=0.

For the standard horn, the aperture efficiency $\eta$ and the azimuth angle $v$ at which a null point appears are calculated to be 81% and $\sin^{-1}(3\lambda/2A)$, respectively.

For the stepped horn, the aperture efficiency $\eta$ is at the maximum when $\zeta=\frac{1}{3}$. Then, $\eta=90\%$, and $v=\sin^{-1}(\sqrt{5}\lambda/2A)$.

In the following, a design example of the antenna assembly in the case where the stepped horn is used will be described.

With the radar antenna assembly 11 including the receiving antennas 311, the resolution improves as the number of antennas increases. As the number of antennas increases, however, the cost also increases. Given the same number of antennas, as the interval P between the receiving antennas 311 increases, the resolution increases, although the detectable angle range decreases. In the preferred embodiments described below, the interval P between the receiving antennas 311 is selected to be 9.4 mm (2.4λ), in order to maximize the resolution while ensuring a detectable angle range that allows monitoring of the lane in front of an automobile with the radar antenna assembly in which the automobile is traveling and the left and right adjacent lanes.

From the electrical point of view, the lateral width $A_r$ of the receiving horn 321 is desirably as great as possible. From the point of view of manufacture, however, the wall between the adjacent horns needs to have a certain thickness. Based on study of casting conditions, the thickness of the wall is determined to be 0.8 mm. The lateral width $A_r$ of the receiving horn 321 is determined to be 8.6 mm, and the longitudinal length Br is determined to be 3.8 mm based on the conditions described later.

Figure 3A:
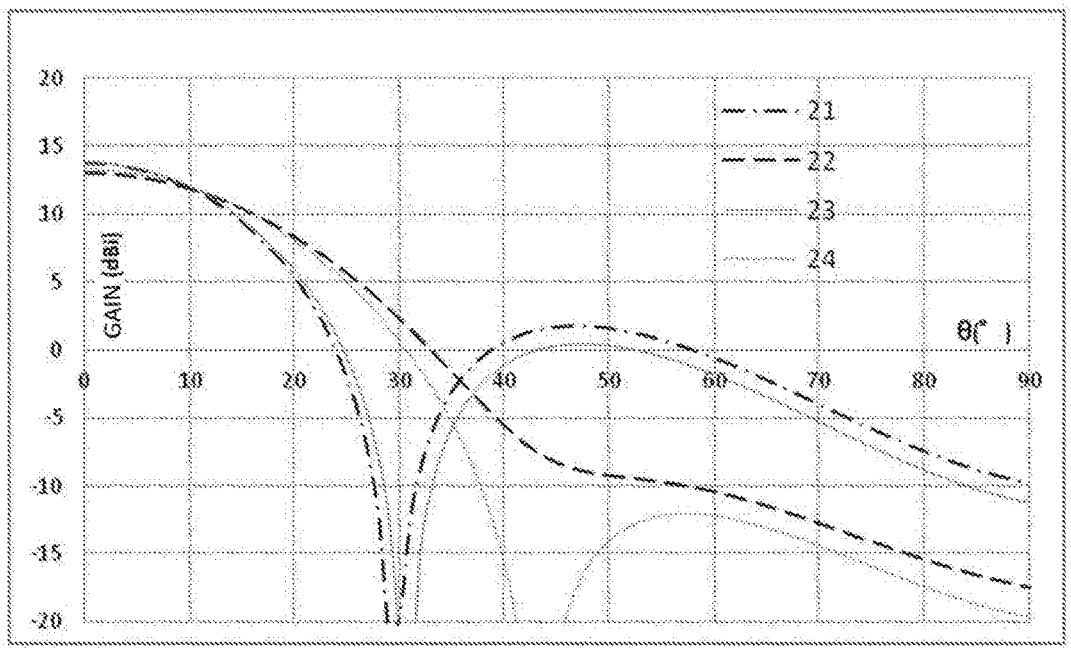
FIG. 3A shows horizontal directivity characteristics of the receiving horn according to the first preferred embodiment of the present invention.
Figure 3B:
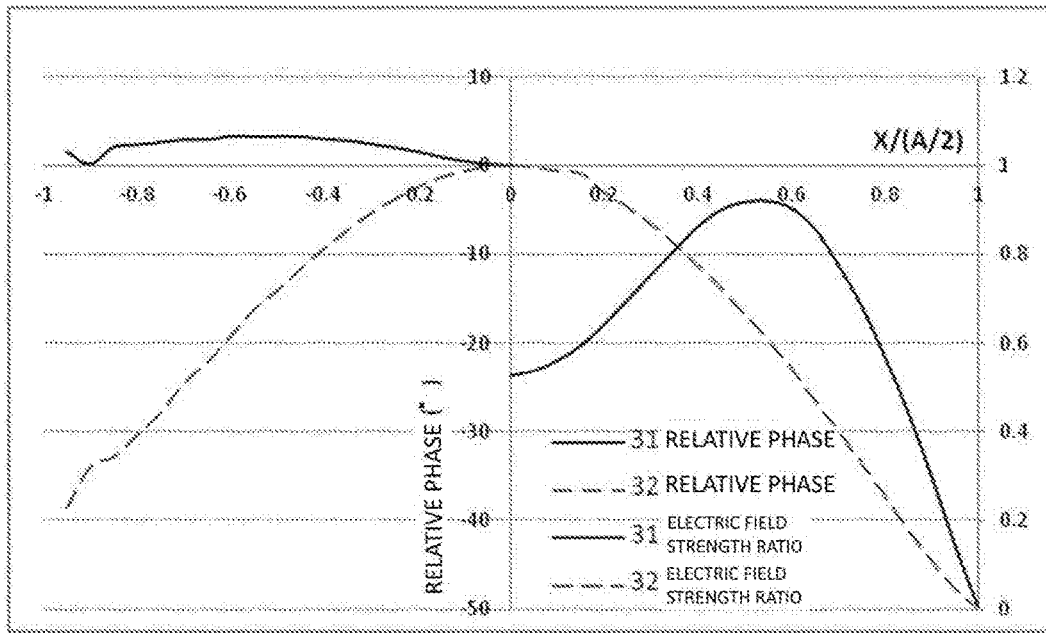
FIG. 3B shows an electric field strength and a phase distribution in the X direction in an aperture plane obtained by actual shape analysis according to the first preferred embodiment of the present invention.

With reference to FIGS. 3A and 3B, characteristics of the stepped horn and the standard horn will be compared. FIG. 3A shows horizontal directivity characteristics of the receiving horns. The alternate long and short dash line 21 shows characteristics of an actual stepped horn (receiving horn 321), and the dashed line 22 shows characteristics of the standard horn (Receiving horn 32), which are an analysis result obtained by a three-dimensional simulator. The horns have the same aperture area and the same depth. As a result of the dimensions being selected to maximize the gain, the depth Hr is determined to be 7.1 mm, and Cr is determined to be 3.8 mm, where C denotes the width dimension in the X direction of the flat surface portion 8. As can be seen, the stepped horn has a higher peak gain than the standard horn.

The thin solid line 23 and the dotted line 24 show calculation results obtained by plane wave analysis. The thin solid line 23 shows a result of calculation under the condition of efficiency maximization ($\zeta=\frac{1}{3}$) described above, and the dotted line 24 shows a result of calculation in the case where there is only the TE10 mode. The alternate long and short dash line 21 and the thin solid line 23, which show calculation results for the stepped horn, substantially agree with each other. To the contrary, comparing between the dotted line 22 and the dotted line 24, which show calculations results for the standard horn, the dotted line 22 obtained by actual shape analysis by a three-dimensional simulator shows no null point and low peak gain. This is because the actual shape analysis is affected by the phase delay caused by the curvature of the wave front, although the plane wave analysis is not affected by the same. In other words, the deviation of the result of the plane wave analysis, which is a simpler analysis method, from the actual shape analysis is more noticeable for the standard horn.

FIG. 3B shows an electric field strength and a phase distribution in the X direction in the aperture plane 7 of the receiving horn 321 obtained by actual analysis. The characteristics are left-right symmetrical to each other, and therefore, FIG. 3B shows only the right halves of the electric field strength and the phase distribution in front of radar antenna assembly. The right half of FIG. 3B shows the electric field strength, and the left half of FIG. 3B shows the phase distribution.

The solid line 31 shows characteristics of the stepped horn (the characteristics of the stepped horn are shown by the alternate long and short dash line 21 in FIG. 3A). The dashed line 32 shows characteristics of the standard horn (the characteristics of the standard horn are shown by the dashed line 22 in FIG. 3A). The electric field strength is a relative value with respect to a same input electric power with reference to the value at the center of the aperture plane 7 of the standard horn. Although the solid line 31 shows a substantially flat phase distribution, the dashed line 32 shows a phase delay. That is, the stepped horn has not only an effect of modifying the electric field strength at the aperture plane 7 and but also an effect of compensating for the phase delay.

Next, array characteristics will be described.

In the case where a plurality of antenna elements having the same radiation characteristics D are arranged to form an antenna array, the directivity characteristics of the antenna array is the product of the radiation characteristics of each individual antenna element and an array factor (directivity characteristics depending on the arrangement of the array) F.

The efficiency is at the maximum when the radiating elements are supplied with an equal electric power in phase with each other. The array factor F of an array composed of M array elements arranged in line at regular intervals S is expressed by the following expression.

$$F = \sin\left(\frac{\pi MS \cdot \sin\theta}{\lambda}\right) / \sin\left(\frac{\pi S \cdot \sin\theta}{\lambda}\right) \qquad \text{Expression 12}$$

Radiation characteristics of the antenna arrays according to the first preferred embodiment and the modification thereof will be described. The transmitting antennas 21 and 211 and the receiving antennas 31 and 311 each include an antenna array including a total of 14 stages of array elements, an upper stage of seven array elements and a lower stage of seven array elements. In the following, the number of stages of antennas will be denoted by M, and the number of stages of antennas in the oblique arrangement portion and the reverse oblique arrangement portion will be each denoted by N.

First, the directivity characteristics of the transmitting antenna configured as described above will be described.

Figure 4:
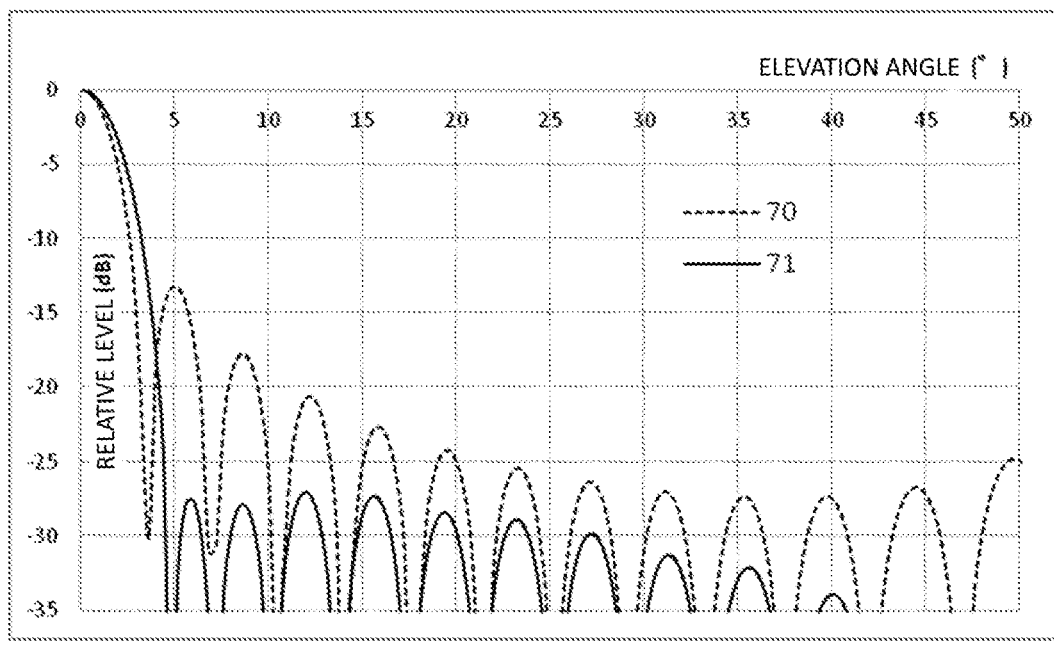
FIG. 4 shows elevational directivity characteristics of the radar antenna assembly according to the first preferred embodiment of the present invention.

FIG. 4 shows the directivity characteristics in an elevational direction of the transmitting antenna 211 in the case where M=2N=14 (N=7). In order to supply electric power to the horns in phase with each other, the interval Sy in the Y direction between the horns has to agree with the guide wavelength of the rectangular waveguide 9 that supplies electric power to each slot, so that Sy is set at 4.6 mm. In addition, the long side width Wa of the rectangular waveguide 9 is set at 3.74 mm. The dotted line 70 shows characteristics in the case where electric power is equally supplied to the slots. The array factor is expressed by Expression 12. The calculations are made on the assumption that each horn has the horizontal directivity characteristics shown by the alternate long and short dash line 21 in FIG. 3A. It is possible to adjust the directivity of the antenna array by shifting the phase of the electric power supplied to the horns. In that case, the interval Sy deviates from the guide wavelength of the rectangular waveguide 9 according to the phase shift.

The actual radar antenna assembly is preferably configured so that high electric power is supplied to a center portion, and a lower electric power is supplied to a portion close to either end, in order to reduce the side lobe. The solid line 71 in FIG. 4 shows an example of the characteristics in the case where such electric power distribution is applied. The oblique arrangement portion and the reverse oblique arrangement portion have symmetrical electric power supply patterns.

The ratio between electric power supplied to the first horn, the second horn, . . . and the seventh horn from the center of the radar antenna assembly is as follows.
0.27:0.24:0.2:0.13:0.08:0.04:0.04
The dotted line 70 and the solid line 71 show relative values with respect to a peak value for θ=0 (that is, on the assumption that the peak value for θ=0 is 0 dB).

The transmitting antennas 21 and 211 have the oblique arrangement portion 4 and the reverse oblique arrangement portion 5 along the Y direction, and the oblique arrangement portion 4 and the reverse oblique arrangement portion 5 are preferably symmetrical to each other. The array factor F in the YZ plane (that is, in the elevational direction) is not affected by the way of arrangement of the oblique arrangement portion 4 and the reverse oblique arrangement portion 5 and is determined by only the interval between the antenna elements in the Y direction. Similarly, the array factor F in the XZ plane (that is, in the horizontal direction) is determined by only the interval between the antenna elements in the X direction. The number of antenna elements included in the oblique arrangement portion 4 and the number of antenna elements included in the reverse oblique arrangement portion 5 are equal to each other. In other words, M=N. Therefore, a first null point μ in the case where equal electric power is supplied to the antenna array in which the antenna elements are arranged at regular intervals Sx in the X direction is determined by calculating the minimum value of θ that makes F equal to 0 in Expression 12, and is expressed by Expression 13 below.

$$\mu = \sin^{-1}\left(\frac{\lambda}{N \cdot S_X}\right)$$ Expression 13

Preferred embodiments of the present invention reduce the sensitivity of the radar in the outside region by utilizing three null points that appear due to the receiving horns themselves, the transmitting horns themselves and the displacement between the transmitting horns in the X direction. In the following, as a non-limiting example of a preferred embodiment of the present invention, operations and effects will be compared for the case where the transmitting antennas are arranged at regular intervals both in the X direction and the Y direction and supplied with equal electric power.

As described above, the interval P between the receiving antennas 311 preferably is 9.4 mm (2.4λ), which is slightly greater than the lateral width $A_r$ (=8.6 mm) of the receiving horn 321. Therefore, a null point $v_r$ (=$\sin^{-1}(\sqrt{5}\lambda/2A_r)$) that appears in the directivity in the X direction in the case where the receiving horn 321 is used by itself is located slightly outside of the azimuth γ (=$\sin^{-1}(\lambda/P)$) (Expression 5). The horizontal directivity characteristics of the receiving horn 321 by itself are shown by the alternate long and short dash line 21 in FIG. 3A.

Figure 5:
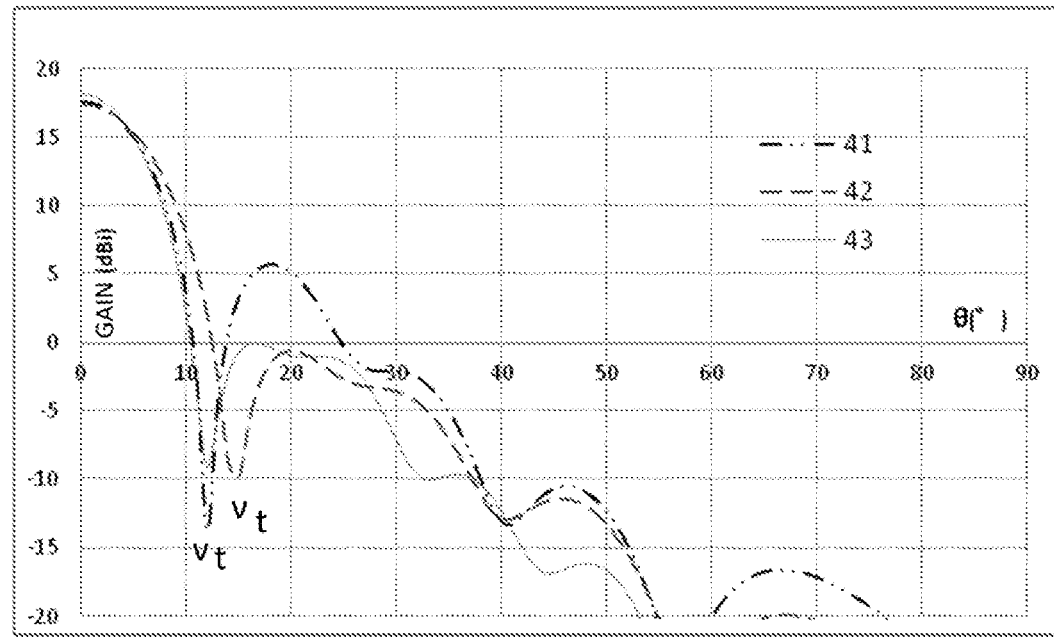
FIG. 5 shows horizontal directivity characteristics of a transmitting horn according to the first preferred embodiment of the present invention.

Next, dimensions of the transmitting antenna will be described. The width ($A_t$) of the transmitting horn 221, the width ($C_t$) of the flat surface portion 8, and the depth ($H_t$) are selected so that a null point that appears in the directivity in the X direction in the case where the transmitting horn 221 is used by itself agrees with χ (azimuth at which the difference in phase of the received signal between adjacent receiving antenna elements is π). As used herein, the "width" refers to the dimension in the X direction in FIG. 2A, and the "depth" refers to the dimension in the Z direction. A longitudinal dimension $B_t$ described later refers to the dimension in the Y direction. With this transmitting antenna, it is possible that a null point μ expressed by Expression 13 that appears as a result of the transmitting horn 221 having the oblique arrangement portion 4 and the reverse oblique arrangement portion 5 is located between $v_t$ and $v_r$ as appropriate. FIG. 5 shows the horizontal directivity characteristics of the transmitting horn 221 in the case where these dimensions are selected.

The longitudinal dimension $B_t$ of the aperture plane 7 of the transmitting horn 221 is preferably set to be 3.8 mm, which is equal to the same dimension of the receiving horn 321. If the interval P between the antenna elements is 9.4 mm, χ=12°. The alternate long and two short dash line 41 shows characteristics in the case where the dimensions are selected so that $v_t$=χ under the condition of efficiency maximization (ζ, which is the ratio between the TE30 mode and the TE10 mode, is approximately ⅓). In this example, the aperture width $A_t$ is 21 mm, the long side width $C_t$ of the flat surface portion 8 is 8.5 mm, and the length $H_t$ of the horn is 26 mm.

The dashed line 42 shows the characteristics in the case where the aperture width $A_t$ is still 21 mm, but ζ is set to be smaller. In this case, $C_t$=7.2 mm, and $H_t$=23.8 mm. In this case, the side lobe is reduced, although the null point $v_t$ moves outward.

The thin solid line 43 shows the radiation characteristics in the case where the dimensions are selected so that the null point appears at the same position as in the case shown by the alternate long and two short dash line 41 and the same side lobe level as in the case shown by the dashed line 42 is achieved. In this case, $A_t$=25.5 mm, $C_t$=7.8 mm, and $H_t$=32.6 mm. Thus, the depth of the horn has to be increased.

FIG. 6 is a graph showing horizontal directivity characteristics of the radar antenna assembly 11. The values on the vertical axis of the graph are relative values.

Each receiving horn 321 has the reception characteristics (Dr) shown by the alternate long and short dash line 21 in FIG. 3A, and the transmitting horns 221 have the radiation characteristics (Dt) shown by the alternate long and two short dash line 41 in FIG. 4. The dotted line 52 shows an array factor (Fx) depending on the interval between the transmitting horns. The interval Sx between the transmitting horns 221 in the X direction is 1.98 mm. The null points are arranged in the order of the null point $v_t$, the null point μ, and the null point $v_r$. The solid line 50 shows transmission/reception horizontal directivity characteristics (=Dr*Dt*Fx) of the radar antenna assembly 11.

Figure 7:
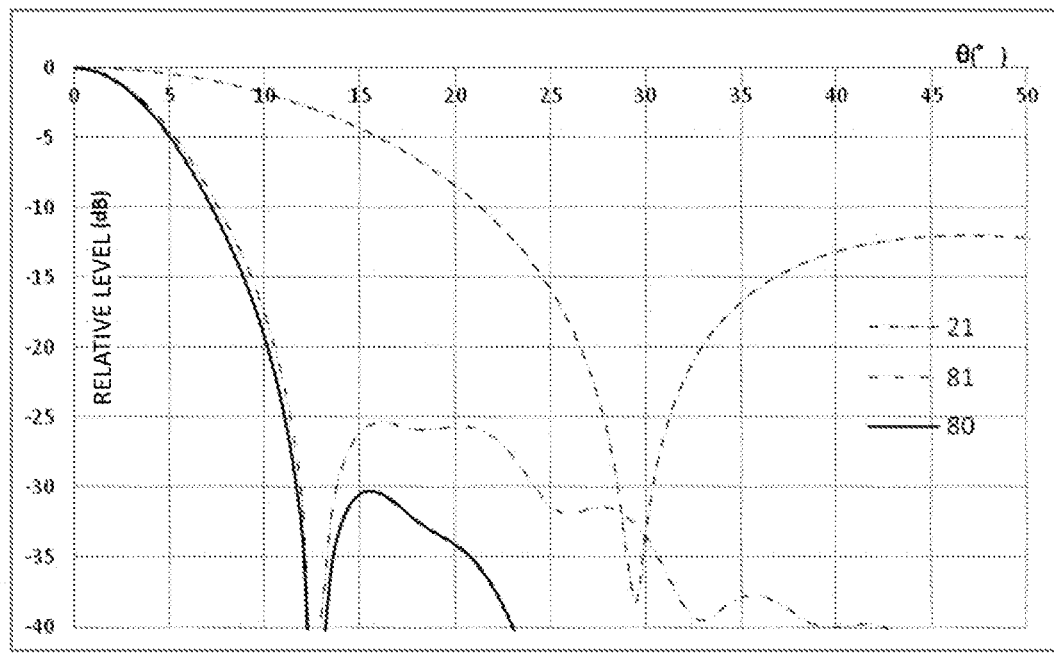
FIG. 7 shows horizontal directivity characteristics of a radar antenna assembly of a conventional design example.

FIG. 7 shows horizontal directivity characteristics of the conventional design example described in Japanese Patent Laid-Open No. 2013-032979. Each receiving horn has the same radiation characteristics as those shown by the alternate long and short dash line 21 in FIG. 5. The alternate long and short two dash line 81 shows horizontal directivity characteristics of the transmitting horn. Since the array factor depending on the arrangement of the transmitting horns is not used, the side lobe has to be substantially reduced. Therefore, the lateral width and the depth of the transmitting horn need to be increased: $A_t$=40 mm, $C_t$=7.6 mm, and $H_t$=58 mm. The solid line 80 shows transmission/reception horizontal directivity characteristics (=Dr*Dt) of the radar antenna assembly.

Comparison between FIGS. 6 and 7 shows that the side lobe sensitivity is able to be more significantly reduced according to preferred embodiments of the present invention. In addition, the dimensions, in particular, the depth, of the transmitting horn can be reduced.

In this example, the transmitting antenna has the oblique arrangement portion and the reverse oblique arrangement portion that are arranged in symmetry in the Y direction, and the receiving antenna has a linear arrangement extending in the Y direction. However, the same effect can be achieved if the receiving antenna has the oblique arrangement portion and the reverse oblique arrangement portion that are arranged in symmetry in the Y direction, and the transmitting antenna has a linear arrangement extending in the Y direction. In that case, however, all of the plurality of receiving antennas have to have the oblique arrangement portion and the reverse oblique arrangement portion that are arranged in symmetry in the Y direction, leading to a more complicated structure. It is also possible that both the transmitting antenna and the receiving antenna have the oblique arrangement portion and the reverse oblique arrangement portion that are arranged in symmetry in the Y direction. Although this also leads to a more complicated structure, this provides an improvement that the signal reception strength in the outside region is able to be further reduced because of a null point caused by the receiving horn including the oblique arrangement portion and the reverse oblique arrangement portion.

A radar antenna assembly 12 according to a second preferred embodiment of the present invention has a structure in which the interval Sx in the X direction between the transmitting horns 221 is selected so that the null point μ depending on the array factor F agrees with χ (angle at which the difference in phase of the received signal between adjacent receiving antenna elements is π), and the null point $v_t$ of the transmitting horn 221 is located between the null point μ depending on the array factor F and the null point $v_r$ of the receiving horn 321 as appropriate.

A condition for μ=χ in the case where the transmitting horn elements are arranged at regular intervals in the X direction and supplied with equal electric power is that the right sides of Expressions 4 and 13 are equal. That is, N*Sx=2P. If Sx is greater than 2P/N, μ<N, that is, the null point undesirably appears in the main region. Thus, an upper limit of Sx is expressed by Expression 14 below.

$$S_X \le \frac{2P}{N} \qquad \text{Expression 14}$$

Figure 8:
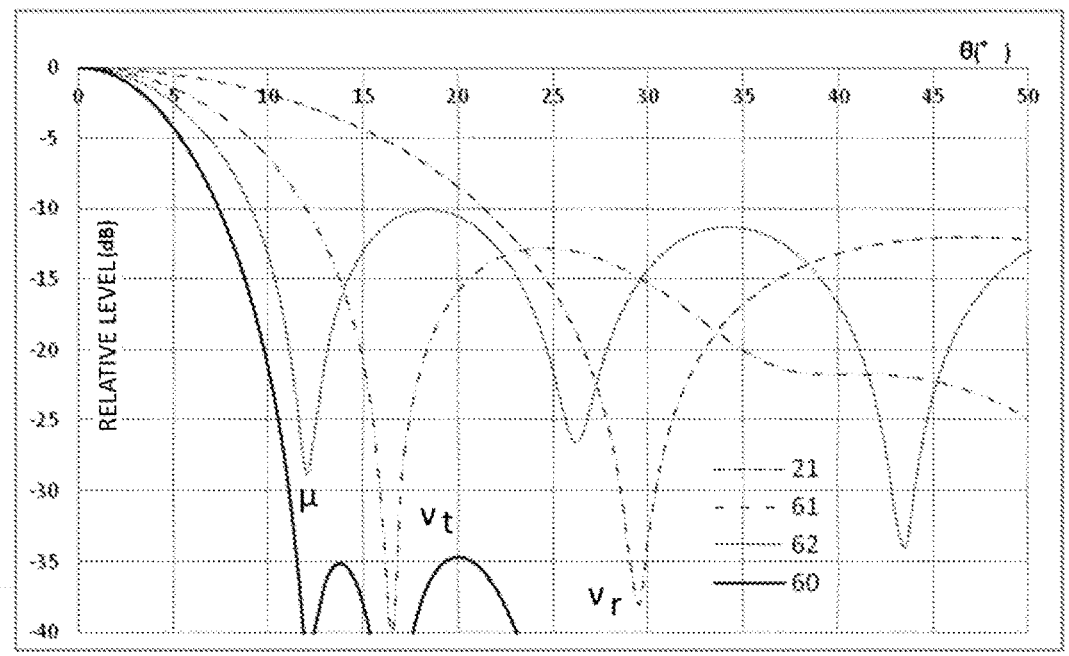
FIG. 8 shows horizontal directivity characteristics of a radar antenna assembly according to a second preferred embodiment of the present invention.

FIG. 8 shows horizontal directivity characteristics of the radar antenna assembly 12 according to the second preferred embodiment. As shown in FIG. 8, the null points are arranged in the order of the null point μ, the null point $v_t$, and the null point $v_r$.

Figure 9:
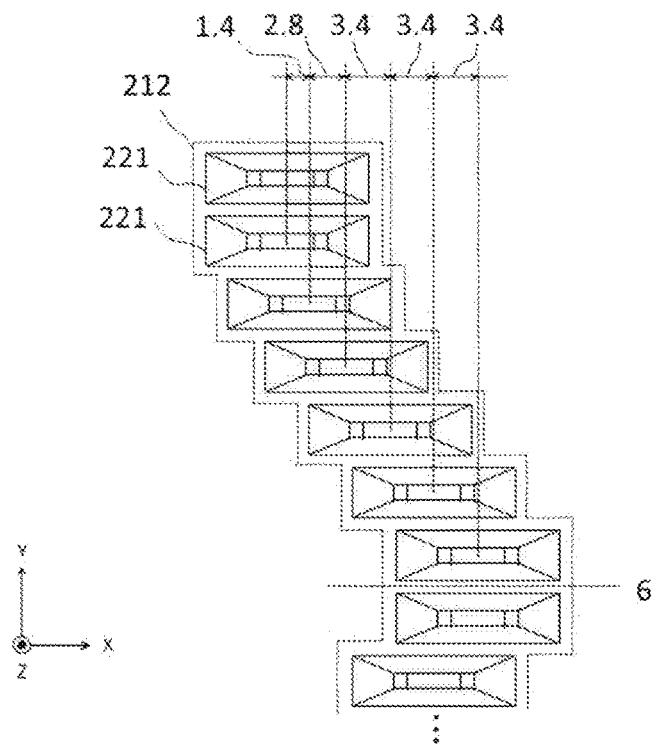
FIG. 9 shows a configuration of a transmitting horn according to the second preferred embodiment of the present invention.

FIG. 9 shows a configuration of a transmitting antenna 212 of the radar antenna assembly 12. In this preferred embodiment, the intervals in the X direction between the transmitting horns 221 are 3.4, 3.4, 3.4, 2.8, 1.4 and 0.0 viewed from the center of the transmitting antenna. That is, there are at least two sorts of magnitude of intervals Sx1 in the X direction between the transmitting horns 221.

In FIG. 8, each receiving horn 321 has the same directivity characteristics as the characteristics shown by the alternate long and short dash line 21 in FIG. 6. In this example, the interval Sx1 in the X direction between the transmitting horns 221 is adjusted to make the null point μ that appears as a result of the transmitting antenna 212 having the oblique arrangement portion and the reverse oblique arrangement portion agree with χ. The dotted line 62 shows an array factor. The alternate long and short two dash line 61 shows radiation characteristics of the transmitting horn 221. In this case, the dimensions of the transmitting horn 221 are selected as follows: $A_t$=16 mm, $C_t$=7.6 mm, and $H_t$=17 mm. Both the aperture width and the length of the transmitting horn 221 can be further reduced compared with the first preferred embodiment.

The characteristics of the transmitting horn 221 in this design example are the same as the characteristics shown by the solid line 71 in FIG. 4, and the side lobe is reduced in the elevational direction.

In this case, the same null characteristics as in the case where the transmitting antenna elements arranged at regular intervals are supplied with equal electric power are able to be achieved by adjusting the interval in the X direction according to the electric power supplied to each transmitting horn 221.

More specifically, the interval between the transmitting horns 221 is set to be greater in the central portion where higher electric power is supplied to the transmitting horns and set to be smaller in the portions close to either end. Thus, an average value σ of the intervals Sx1 is smaller than the interval Sx in the case where the transmitting horns are arranged at regular intervals and supplied with equal electric power. That is, the transmitting horns closer to either end make smaller contributions to the array factor, and the transmitting horns closer to the center make dominant contributions to the array factor. Thus, in a practical design as an onboard radar antenna assembly, the average value can be given in the following range.

$$S_X > \sigma \ge \frac{S_X \cdot (N-1)}{N} \qquad \text{Expression 15}$$

The average value σ of the intervals between the transmitting horns 221 is 2.40 mm. Compared with the interval Sx=2.69 mm in the case where the transmitting horns are arranged at regular intervals, σ=0.89Sx. The right side of Expression 15 is 0.86Sx, and therefore, the average value σ satisfies Expression 15. In a region where θ is approximately equal to χ, even a small change in azimuth of the incoming wave can cause horizontal inversion of the detection value Θ, and detection is unstable because the region is close to a null point and the input level is low. Thus, with the onboard radar, it is common practice to set the angular field of view (azimuth range to be monitored) $θ_v$ to be somewhat smaller than the main region range.

For example, if $θ_v$=0.9χ, the range of θ approximately from 0.9χ to 1.1χ is outside of the monitoring range, and the signal level has only to be reduced in the range outer than 1.1χ. Thus, the antenna assembly only has to provide the null point $v_t$ that appears in the directivity in the X direction in the case where the transmitting horn is used by itself or the null point μ that occurs as a result of the transmitting antenna having the oblique arrangement portion and the reverse oblique arrangement portion in the direction of 1.1χ, and the dimensions of the horn can be further reduced. As a result, the signal level at the edge (θ=0.9χ) of the angular field of view can be increased, and the stability of the detection can be improved.

As an alternative, a preferred embodiment is possible that puts a higher premium on the front direction and, in particular, reduces erroneous detection Θ≈0. In this case, a null point is provided in the γ direction in which a grating lobe appears. In the first preferred embodiment, this characteristic is achieved by setting μ=γ.

If μ>γ, the effect of reducing the signal level is reduced, and a useful improvement is not expected. Therefore, according to preferred embodiments of the present invention, a range of μ≤γ is considered effective.

In view of the above discussion, effective ranges according to preferred embodiments of the present invention will be summarized. The transmitting horns included in the oblique arrangement portion or the reverse oblique arrangement portion are adjacent to each other in the first direction with at least two sorts of magnitude of displacement in the second direction therebetween, the number of the transmitting horns is 2N, where N denotes an integer equal to or greater than 1.

First, in the second preferred embodiment of the present invention, the upper limit of σ is reached in the case where the transmitting horns are arranged at regular intervals and supplied with equal electric power as expressed by Expression 14. In this case, σ=Sx, so that Expression 16 below results.

$$\sigma \le \frac{2P}{N} \qquad \text{Expression 16}$$

From Expressions 5 and 13, the condition for μ=γ is Sx=P/N in the case where the transmitting horns are arranged at regular intervals and supplied with equal electric power. From the relation between σ and Sx expressed by Expression 15, a lower limit of σ is expressed by Expression 17 below.

$$\sigma \ge \frac{P \cdot (N-1)}{N} \bigg/ N = \frac{P \cdot (N-1)}{N^2} \qquad \text{Expression 17}$$

FIG. 10A shows a radar antenna assembly including a fixing member. FIG. 10B is a cross-sectional view of the radar antenna assembly taken along the line G-G in FIG. 10A. A radar antenna assembly 1 includes a horn member H1, a plate member P1, and a feed member F1. The horn member H1 is a flat metal plate in which horn-shaped and rectangle-shaped grooves are formed. The plate member P1, which is made of metal, is fitted onto the horn member H1 from the −Z direction to form a hollow rectangular waveguide 9. The feed member F1, which is made of metal, is fit onto the plate member P1 from the −Z direction. The horn member H1, the plate member P1 and the feed member F1 are firmly integrated with each other by a screw or the like (not shown). An MMIC is mounted on the feed member F1. A radio wave generated by the MMIC is transmitted to a transmitting antenna 21 through the feed member F1.

In FIG. 10A, the contours of the horn member H1 and the plate member P1 on the right side conform to the contours of an oblique arrangement portion 4 and a reverse oblique arrangement portion 5 of the transmitting antenna 21, although the contour of the feed member F1 on the right side is expanded in the +X direction. Besides, on the left side, the contour of the plate member P1 is the same as the contour of the horn member H1. Thus, FIG. 10A does not show the plate member P1. The contour of the feed member F1 on the left side is expanded in the −X direction. The feed member F1 has a rectangular shape as a whole.

The radar antenna assembly 1 further includes fixing members S1, S2, S3 and S4. The fixing members S1 to S4 fix the radar antenna assembly 1 to a cover (not shown) that houses the radar antenna assembly 1. The fixing members S1 to S4 are located at the four corners of the feed member F1. Preferably, the fixing members S1 and S2 are located at positions on the same line passing through the V-shaped bent portion in the Y direction. Since the transmitting antenna 21 is V-shaped, there is a space available for placement of the fixing members.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A radar antenna assembly, comprising:
a transmitting antenna including a plurality of transmitting horns defining an oblique arrangement portion and a reverse oblique arrangement portion; and
a plurality of receiving antennas each including a plurality of receiving horns arranged in a first direction; wherein
the plurality of receiving antennas are arranged in a second direction perpendicular or substantially perpendicular to the first direction;
the transmitting antenna is disposed adjacent to the receiving antennas in the second direction;
the transmitting horns included in the oblique arrangement portion are displaced from each other in the second direction along the arrangement of the transmitting horns in the first direction, and the transmitting horns included in the reverse oblique arrangement portion are displaced from each other in a direction opposite to the second direction along the arrangement of the transmitting horns in the first direction;
the plurality of transmitting horns are disposed at regular intervals in the first direction;

the reverse oblique arrangement portion is disposed adjacent to the oblique arrangement portion in the first direction;

the arrangement of the transmitting horns included in the oblique arrangement portion and the arrangement of the transmitting horns included in the reverse oblique arrangement portion are symmetrical to each other with respect to a plane perpendicular or substantially perpendicular to the first direction;

the transmitting horns included in the oblique arrangement portion or the reverse oblique arrangement portion are adjacent to each other in the first direction with at least two different magnitudes of displacement in the second direction therebetween;

a number of the transmitting horns is 2N, where N denotes an integer equal to or greater than 1;

the plurality of receiving antennas are arranged at regular intervals P in the second direction; and an average value of displacements in the second direction between the transmitting horns adjacent in the first direction is equal to or smaller than 2P/N and equal to or greater than $P(N-1)/N^2$.

2. The radar antenna assembly according to claim 1, wherein the oblique arrangement portion and the reverse oblique arrangement portion have a V-shaped or substantially V-shaped arrangement as a whole.

3. The radar antenna assembly according to claim 2, wherein the transmitting horn and the receiving horn each connect to a rectangular waveguide at a base portion thereof;

at least one of the transmitting horn and the receiving horn includes a flat surface portion between the rectangular waveguide and the horn, the flat surface portion extending from an inner wall of the transmitting horn or the receiving horn toward the rectangular waveguide; and the flat surface portion is perpendicular or substantially perpendicular to an axis of the horn.

4. A radar device, comprising:
a radar antenna assembly according to claim 3;
a radio wave transmitter including at least one channel of a transmitting end; and
a radio wave receiver including a plurality of receiving ends;
the transmitting antenna being connected to the transmitting end; and
each of the plurality of receiving antennas being connected to a different one of the plurality of receiving ends; wherein
a null point of a transmitting horn, which is a null point that appears in a directivity in the second direction in a case where the transmitting horn is used by itself, and an azimuth at which the phase difference between waves received by a pair of the receiving antennas adjacent in the second direction is π agree with each other; and
a null point that appears as a result of the transmitting antenna including the oblique arrangement portion and the reverse oblique arrangement portion is located between the azimuth of the null point of the transmitting horn and a null point that appears in the directivity in the second direction in a case where the receiving horn is used by itself.

5. A radar device, comprising:
a radar antenna assembly according to claim 3;
a radio wave transmitter including at least one channel of a transmitting end; and
a radio wave receiver including a plurality of receiving ends;
the transmitting antenna being connected to the transmitting end; and
each of the plurality of receiving antennas being connected to a different one of the plurality of receiving ends; wherein
a null point that appears as a result of the transmitting antenna including the oblique arrangement portion and the reverse oblique arrangement portion and an azimuth at which the phase difference between waves received by a pair of the receiving antennas adjacent in the second direction is π agree with each other; and
a null point of a transmitting horn, which is a null point that appears in a directivity in the second direction in a case where the transmitting horn is used by itself is located between the null point that appears as a result of the transmitting antenna including the oblique arrangement portion and the reverse oblique arrangement portion and a null point that appears in the directivity in the second direction in a case where the receiving horn is used by itself.

6. A radar device, comprising:
a radar antenna assembly according to claim 2;
a radio wave transmitter including at least one channel of a transmitting end; and
a radio wave receiver including a plurality of receiving ends;
the transmitting antenna being connected to the transmitting end; and
each of the plurality of receiving antennas being connected to a different one of the plurality of receiving ends; wherein
a null point of a transmitting horn, which is a null point that appears in a directivity in the second direction in a case where the transmitting horn is used by itself, and an azimuth at which the phase difference between waves received by a pair of the receiving antennas adjacent in the second direction is π agree with each other; and
a null point that appears as a result of the transmitting antenna including the oblique arrangement portion and the reverse oblique arrangement portion is located between the azimuth of the null point of the transmitting horn and a null point that appears in the directivity in the second direction in a case where the receiving horn is used by itself.

7. A radar device, comprising:
a radar antenna assembly according to claim 2;
a radio wave transmitter including at least one channel of transmitting end; and
a radio wave receiver including a plurality of receiving ends;
the transmitting antenna being connected to the transmitting end; and
each of the plurality of receiving antennas being connected to a different one of the plurality of receiving ends; wherein
a null point that appears as a result of the transmitting antenna including the oblique arrangement portion and the reverse oblique arrangement portion and an azimuth at which the phase difference between waves received by a pair of the receiving antennas adjacent in the second direction is π agree with each other; and
a null point of a transmitting horn, which is a null point that appears in a directivity in the second direction in a case where the transmitting horn is used by itself is located between the null point that appears as a result of the transmitting antenna including the oblique arrangement portion and the reverse oblique arrangement portion and a null point that appears in the directivity in the second direction in a case where the receiving horn is used by itself.

8. The radar antenna assembly according to claim 1, wherein the transmitting horn and the receiving horn each connect to a rectangular waveguide at a base portion thereof;
at least one of the transmitting horn and the receiving horn includes a flat surface portion between the rectangular waveguide and the horn, the flat surface portion extending from an inner wall of the transmitting horn or the receiving horn toward the rectangular waveguide; and
the flat surface portion is perpendicular or substantially perpendicular to an axis of the horn.

9. A radar device, comprising:
a radar antenna assembly according to claim 8;
a radio wave transmitter including at least one channel of a transmitting end; and
a radio wave receiver including a plurality of receiving ends;
the transmitting antenna being connected to the transmitting end; and
each of the plurality of receiving antennas being connected to a different one of the plurality of receiving ends; wherein
a null point of a transmitting horn, which is a null point that appears in a directivity in the second direction in a case where the transmitting horn is used by itself, and an azimuth at which the phase difference between waves received by a pair of the receiving antennas adjacent in the second direction is π agree with each other; and
a null point that appears as a result of the transmitting antenna including the oblique arrangement portion and the reverse oblique arrangement portion is located between the azimuth of the null point of the transmitting horn and a null point that appears in the directivity in the second direction in a case where the receiving horn is used by itself.

10. A radar device, comprising:
a radar antenna assembly according to claim 8;
a radio wave transmitter including at least one channel of a transmitting end; and
a radio wave receiver including a plurality of receiving ends;
the transmitting antenna being connected to the transmitting end; and
each of the plurality of receiving antennas being connected to a different one of the plurality of receiving ends; wherein
a null point that appears as a result of the transmitting antenna including the oblique arrangement portion and the reverse oblique arrangement portion and an azimuth at which the phase difference between waves received by a pair of the receiving antennas adjacent in the second direction is π agree with each other; and
a null point of a transmitting horn, which is a null point that appears in a directivity in the second direction in a case where the transmitting horn is used by itself is located between the null point that appears as a result of the transmitting antenna including the oblique arrangement portion and the reverse oblique arrangement portion and a null point that appears in the directivity in the second direction in a case where the receiving horn is used by itself.

11. A radar device, comprising:
a radar antenna assembly according to claim 1;
a radio wave transmitter including at least one channel of a transmitting end; and
a radio wave receiver including a plurality of receiving ends;
the transmitting antenna being connected to the transmitting end; and
each of the plurality of receiving antennas being connected to a different one of the plurality of receiving ends; wherein
a null point of a transmitting horn, which is a null point that appears in a directivity in the second direction in a case where the transmitting horn is used by itself, and an azimuth at which the phase difference between waves received by a pair of the receiving antennas adjacent in the second direction is π agree with each other; and
a null point that appears as a result of the transmitting antenna including the oblique arrangement portion and the reverse oblique arrangement portion is located between the azimuth of the null point of the transmitting horn and a null point that appears in the directivity in the second direction in a case where the receiving horn is used by itself.

12. A radar device, comprising:
a radar antenna assembly according to claim 1;
a radio wave transmitter including at least one channel of a transmitting end; and
a radio wave receiver including a plurality of receiving ends;
the transmitting antenna being connected to the transmitting end; and
each of the plurality of receiving antennas being connected to a different one of the plurality of receiving ends; wherein
a null point that appears as a result of the transmitting antenna including the oblique arrangement portion and the reverse oblique arrangement portion and an azimuth at which the phase difference between waves received by a pair of the receiving antennas adjacent in the second direction is π agree with each other; and
a null point of a transmitting horn, which is a null point that appears in a directivity in the second direction in a case where the transmitting horn is used by itself is located between the null point that appears as a result of the transmitting antenna including the oblique arrangement portion and the reverse oblique arrangement portion and a null point that appears in the directivity in the second direction in a case where the receiving horn is used by itself.

* * * * *